(12) United States Patent
Aitcin

(10) Patent No.: US 7,674,197 B2
(45) Date of Patent: Mar. 9, 2010

(54) CONTINUOUSLY VARIABLE TRANSMISSION DRIVEN-PULLEY CAM HAVING THREE CAM SURFACES AND ROLLER THEREFOR

(75) Inventor: Xavier-Pierre Aitcin, St-Hyacinthe (CA)

(73) Assignee: Bombardier Recreational Products Inc., Valcourt (CA)

( * ) Notice: Subject to any disclaimer, the term of this patent is extended or adjusted under 35 U.S.C. 154(b) by 1357 days.

(21) Appl. No.: 11/038,498

(22) Filed: Jan. 21, 2005

(65) Prior Publication Data

US 2005/0209032 A1    Sep. 22, 2005

Related U.S. Application Data

(60) Provisional application No. 60/537,520, filed on Jan. 21, 2004.

(51) Int. Cl.
*F16H 59/00* (2006.01)
*F16H 61/00* (2006.01)
*F16H 63/00* (2006.01)

(52) U.S. Cl. .............................. 474/19; 474/70; 474/21; 474/10

(58) Field of Classification Search ....................... 474/8, 474/10, 19, 21, 70, 14; 74/10.29, 10.6, 838, 74/839, 53–56, 567; 192/54.52, 93 A
See application file for complete search history.

(56) References Cited

U.S. PATENT DOCUMENTS

| | | | | |
|---|---|---|---|---|
| 3,224,287 A | * | 12/1965 | Gesche et al. ................. | 474/19 |
| 6,120,399 A | * | 9/2000 | Okeson et al. ................ | 474/14 |
| 6,146,295 A | * | 11/2000 | Mor et al. ...................... | 474/13 |
| 6,379,274 B1 | * | 4/2002 | Robert ........................... | 474/19 |
| 6,569,043 B2 | * | 5/2003 | Younggren et al. ............ | 474/19 |
| 6,743,129 B1 | * | 6/2004 | Younggren et al. ............ | 474/19 |
| 6,860,826 B1 | * | 3/2005 | Johnson ......................... | 474/19 |
| 7,044,872 B1 | * | 5/2006 | Johnson ......................... | 474/14 |
| 7,179,183 B2 | * | 2/2007 | Borghi ........................... | 474/19 |
| 7,204,771 B2 | * | 4/2007 | Gu et al. ........................ | 474/19 |
| 2003/0019322 A1 | * | 1/2003 | Lee ................................ | 74/567 |
| 2005/0096163 A1 | * | 5/2005 | Gu et al. ........................ | 474/10 |

* cited by examiner

*Primary Examiner*—Bradley T King
*Assistant Examiner*—Thomas W Irvin
(74) *Attorney, Agent, or Firm*—Osler, Hoskin & Harcourt LLP

(57) ABSTRACT

A continuously variable transmission driven-pulley cam having a third cam surface which decreases the travel distance of the roller preventing the drive belt from dropping to a lower radius, thus preventing the transmission from going into a higher gear ratio upon inversion of torque transmitted to the driven pulley. The cam further includes a locking surface which prevents the roller from travelling axially to the cam, thus prevents the inner sheave from moving away from the outer sheave when the driven pulley is operating in the reverse direction. A continuously variable transmission driven-pulley cam roller assembly includes an inner roller and an outer roller wherein the diameters of the inner and outer rollers are different.

13 Claims, 11 Drawing Sheets

CONTINUOUSLY VARIABLE TRANSMISSION DRIVEN-PULLEY CAM HAVING THREE CAM SURFACES AND ROLLER THEREFOR

This application claims the benefit of priority to U.S. Provisional Application 60/537,520 filed on Jan. 21, 2004, the contents of which are incorporated herein by reference.

BACKGROUND OF THE INVENTION

1. Field of the Invention

The subject matter of the present invention concerns Continuously Variable Transmissions (CVT's), generally. More specifically, the invention is related to the torque responsive pulley of a Continuously Variable Transmission system. More specifically, the present invention is related to the cam assembly and roller of the torque responsive pulley of a Continuously Variable Transmission system.

2. Description of the Prior Art

The torque responsive pulley, hereinafter the driven pulley, of a Continuously Variable Transmission, hereinafter CVT, has an inner conical-shaped or progressive angled sheave 40 (also known as the moveable sheave) and an outer conical-shaped or progressive angled sheave 42 (also known as the fixed sheave), as shown in FIG. 3A. The inner and outer sheaves 40, 42 are biased toward each other such that the conical faces 64 and 58 of each sheave are facing each other. The biasing member is a spring 44. For simplicity, reference is made to FIG. 3A showing the cam 20 and roller assembly 22 of the present invention. The remainder of the components shown in FIG. 3 are well known parts of a CVT driven pulley. The conventional driven pulley also comprises a torque sensing device or cam of the types shown in FIGS. 1 and 2 having two sets of cam surfaces, one for clockwise application of torque and one for counterclockwise application of torque. The cam surfaces are angled to provide a ramp or helices over which a slider or roller will contact the surfaces and force the inner sheave away from the outer sheave as the torque load on the driven pulley increases. In a roller-type driven pulley, the cam surfaces are basically a single slope or angled slots within the cam. Each slot provides one surface for the roller during clockwise application of torque of the driven pulley and an opposing surface for the roller during counterclockwise application of torque of the driven pulley. The roller will also contact each surface when the torque transmitted to driven pulley is inverted. Such an example of a roller-type cam can be seen in U.S. Pat. No. 6,120,399. Referring to the '399 patent, torque applied to a driven shaft is communicated by the spider 26 to the motion-producing closed cam 28 that has a diametrically opposed pair of sloped first (inner) cam surfaces 64 spaced-apart from a corresponding pair of diametrically opposed pair of sloped second (outer) cam surfaces 66. A roller 68 fits between each of the corresponding first cam surfaces 64 and second cam surfaces 66. The rollers 68 rotate on a pair of diametrically opposed roller shafts 70. Rollers are secured to the roller shafts 70 by a suitable C-ring, pin, clip or other roller fastener 72.

In certain applications, CVT's are used with engines where the output shaft can rotate in two directions. In these applications, the cam has to be modified to allow the rollers to have sufficient contact surface during initial engagement between the roller and the cam when in the reverse mode. Cam 2, shown in FIG. 1, is suited for reverse operation and thus it has cam surfaces 6 which make contact with the slider during reverse torque operation. In certain CVT applications, it is also known to use these surfaces for engine braking.

Cam 10, shown in FIG. 2, is another example of a prior art cam, which is suitable to be used in a reverse direction. Cams 2 and 10, as shown in FIGS. 1 and 2, have large circumerential distances between opposed cam surfaces 4 and 6 or 12 and 14 thus allowing the pulley sheaves to be forced toward the fully closed position during a change in direction of torque transmitted to the driven pulley. Also, with reference to FIGS. 1 and 2, cams 2 and 10 have no means to prevent the roller or slider from traveling toward the fully opened position when the sheaves are approximately in a fully closed position, i.e. to lock the roller or slider in a certain position between the fully closed and fully opened positions. In both cases, since the cam cannot offer sufficient support to the roller, the transmission is forced into a higher gear ratio than would be optimal for maximum power transmission to the ground engaging tracks or wheels.

A need has therefore arisen for an improved driven-pulley cam and roller therefor.

SUMMARY OF THE PRESENT INVENTION

In view of the forgoing, one aspect of the present invention is a Continuously Variable Transmission Driven-Pulley cam which has three helices per roller axis. The third helix being situated between the first and second cam surfaces in the circumferential direction.

Yet another aspect of the present invention is a Continuously Variable Transmission Driven-Pulley cam which locks the roller into a position preventing the moveable sheave from axial movement when the transmission is operating in the reverse mode.

Another aspect of the present invention is a Continuously Variable Transmission Driven-Pulley cam roller having and inner roller and an outer roller. The inner and outer rollers having different diameters.

Yet another aspect of the present invention is a Continuously Variable Transmission Driven-Pulley cam roller wherein the roller is a single piece.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF PREFERRED EMBODIMENTS OF THE PRESENT INVENTION

Figure 1:
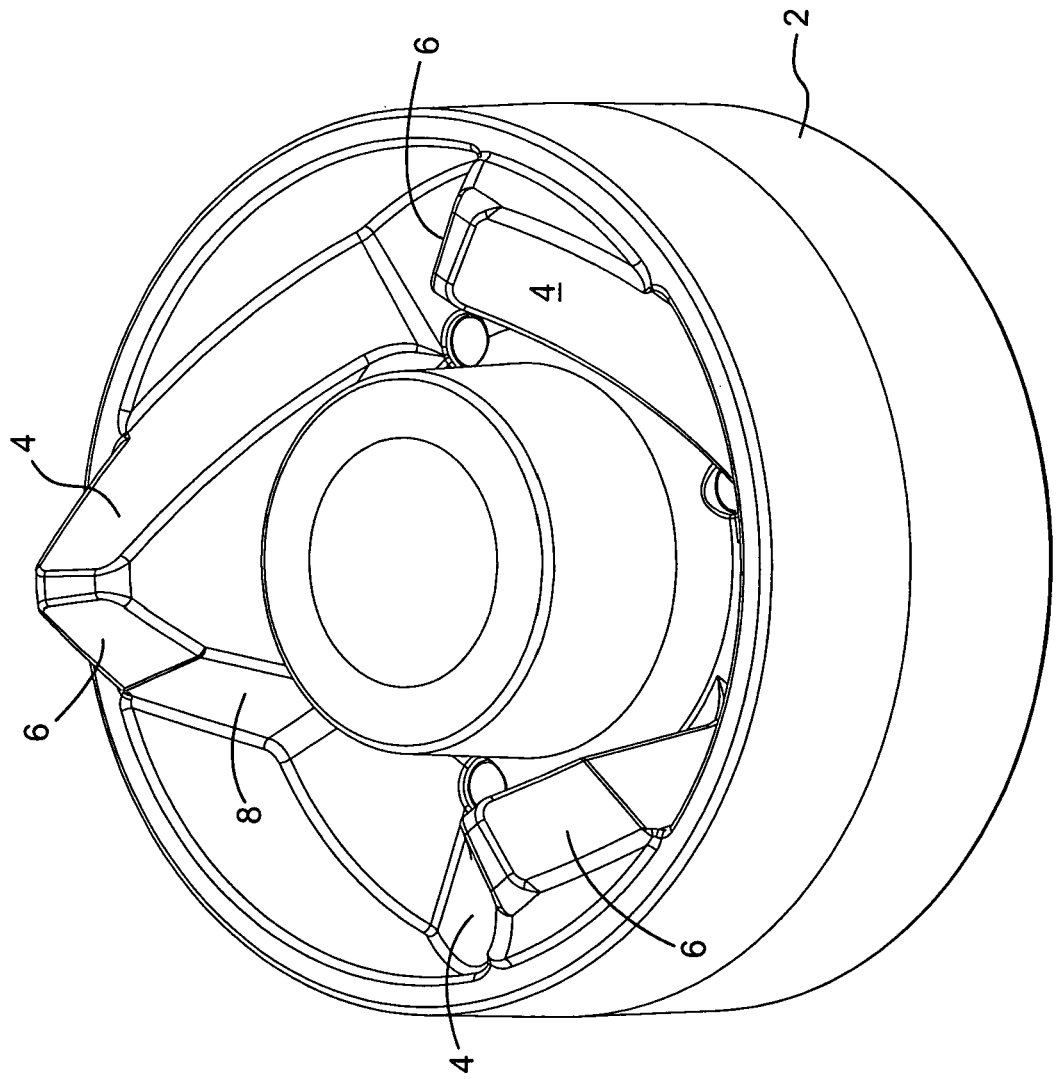
FIG. 1 is a perspective view of a prior art cam used in a slider-type driven pulley, which can be operated in a reverse mode.

Referring to FIG. 1, a prior art slider-type cam 2 is shown having three sets of cam surfaces. Each set of cam surfaces includes a first cam surface 4 and a second cam surface 6. Cam surface 4 is contacted by the forward slider, not shown, during forward rotation of the driven pulley upon which cam 2 is installed or when there is a change in direction of the torque transmitted to the driven pulley when rotating in the reverse direction. Cam surface 6 is contacted by the reverse slider, not shown, during reverse rotation of the driven pulley or when there is a change in direction of the torque transmitted to the driven pulley when rotating in the forward rotation.

Figure 2:
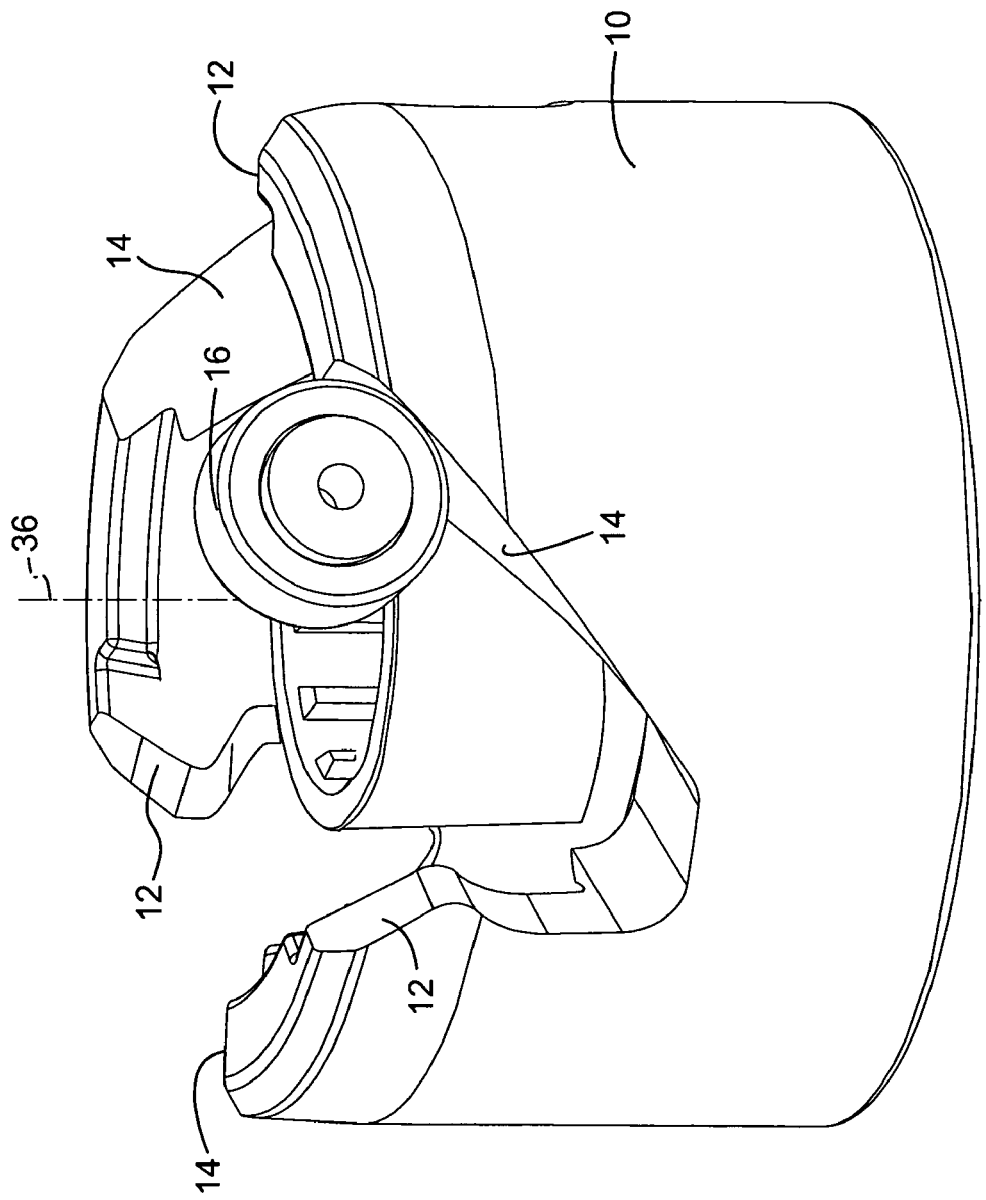
FIG. 2 is a perspective view of a second prior art cam used in a roller-type driven pulley with reverse mode which can be operated in a reverse mode.

Referring to FIG. 2, a prior art roller-type cam 10 is shown having three sets of cam surfaces, each set having two cam surfaces 12 and 14. Cam 10 includes a roller 16, which rolls in contact with cam surfaces 12 and 14. Cam surface 14 is contacted by roller 16 during forward rotation of the driven pulley upon which cam 10 is installed or when there is a change in direction of the torque transmitted to the driven pulley when rotating in the reverse direction. Cam surface 12 is contacted by roller 16 during reverse rotation of the driven pulley or when there is a change in direction of the torque transmitted to the driven pulley when rotating in the forward rotation. It would be appreciated by one skilled in the art that forward rotation refers to the direction the driven pulley must rotate in order to move the vehicle upon which the driven pulley is installed in the forward direction and the reverse rotation is the opposite rotation to the forward rotation.

For simplicity, only one roller 22 is shown in FIGS. 3-8. It would be recognized that cams 1, 10 and 20 are constructed to operate with six sliders or three rollers each, but in no way is the invention to be limited to such a construction. A person skilled in the art would recognize that the present invention covers not only cams having 2 sets of cam surfaces but 4 and more sets of cam surfaces as well, in which case 2 and 4 rollers are needed per cam respectively. In order to better visualize the interaction between the cam 20 and roller assembly 22 of the present invention, the remaining components, inner and outer sheaves, spring etc. have been removed from FIGS. 3, and 4-8.

Figure 3:
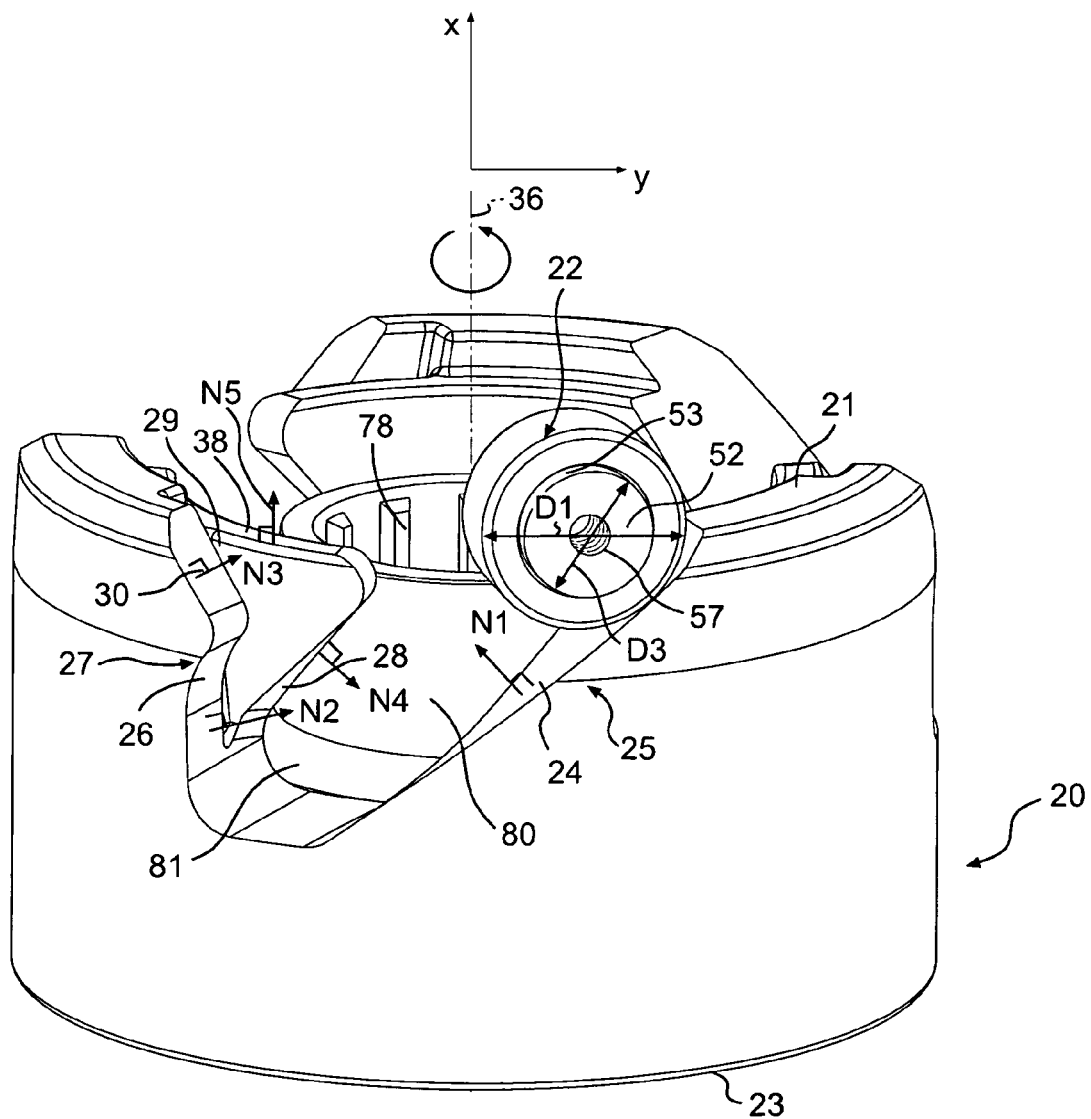
FIG. 3 is a side view of the cam of the present invention with the roller situated in the position where the pulley is in a low gear ratio and the roller is positioned on the forward ramp.

When making reference to the first to fourth quadrants below, it is taken that the axis of rotation 36 lies on the x-axis of the Cartesian coordinates as shown in FIG. 3 and that the cam is rotated about the x-axis such that all the cam surfaces of a single set of cam surfaces are located on one side of a plane containing the x and y axes of the Cartesian coordinates.

FIG. 3 shows the cam of the present invention. Cam 20 has the general shape of a right cylinder with an inner end 21 and a outer end 23. Cam 20 is a roller-type cam having a first helix 25 having a first cam or contact surface 24, a second helix 27 having second cam or contact surfaces 26, 30 and a third helix 29 having third cam or contact surfaces 28, 38. It should be appreciated that cam 20 could also be used with sliders instead of rollers. Cam or contact surface 24 is angled with the axis of rotation 36 such that normal N1, when projected onto the axis of rotation is pointing toward the fourth quadrant. Surface 24 has a width W1 and is radially offset from the axis of rotation 36 by a distance X1. Similar to cam surface 12 described above, cam surfaces 26, 30 support the roller when the driven pulley is being operated in the reverse direction or when there is a reverse in direction of the torque when the driven pulley is operating in the forward direction. Cam or contact surface 26 is also angled with respect to the axis of rotation 36 such that normal N2, when projected onto the axis of rotation 36 is pointing toward the first quadrant. Cam or contact surface 30 is also angled with respect to the axis of rotation 36 such that normal N3 is pointing toward the first quadrant. Surfaces 26 and 30 have a width W2 and are radially offset from the axis of rotation by distance X2. Preferably, surfaces 26 and 30 are part of one continuous surface. Cam or contact surface 28 is also angled with respect to the axis of rotation 36 such that normal N4 is pointing toward the second quadrant. Cam or contact surface 38 is also angled with respect to the axis of rotation 36 and has a normal N5. In the preferred embodiment, normal N5 would be parallel to the axis of rotation 36, but could also point to the first or fourth quadrants. Surfaces 28 and 30 have a width W3 and are radially offset from the axis of rotation 36 by distance X3. Surface 28 of third helix 29 is also circumferentially located between surfaces 24, 26 and 30.

In order to calibrate a driven pulley with a drive pulley, the contact surfaces of such a cam may be angled differently for one vehicle to another and thus the normals may be pointing toward the quadrant above or below that shown in FIG. 3. For example, because surface 26 is approximately shown to be parallel with the axis of rotation 36, the normal N2 could possibly point toward the second quadrant as well as the first quadrant as shown in FIG. 3. Because surface 24 is angled with respect to axis of rotation 36, N1 could also point toward the third quadrant at a certain position along surface 24. Contact or cam surfaces 24, 26, 28, and 30 may also have a certain amount of twist such that the surfaces are not perpendicular to the axis of rotation 36.

Figure 3A:
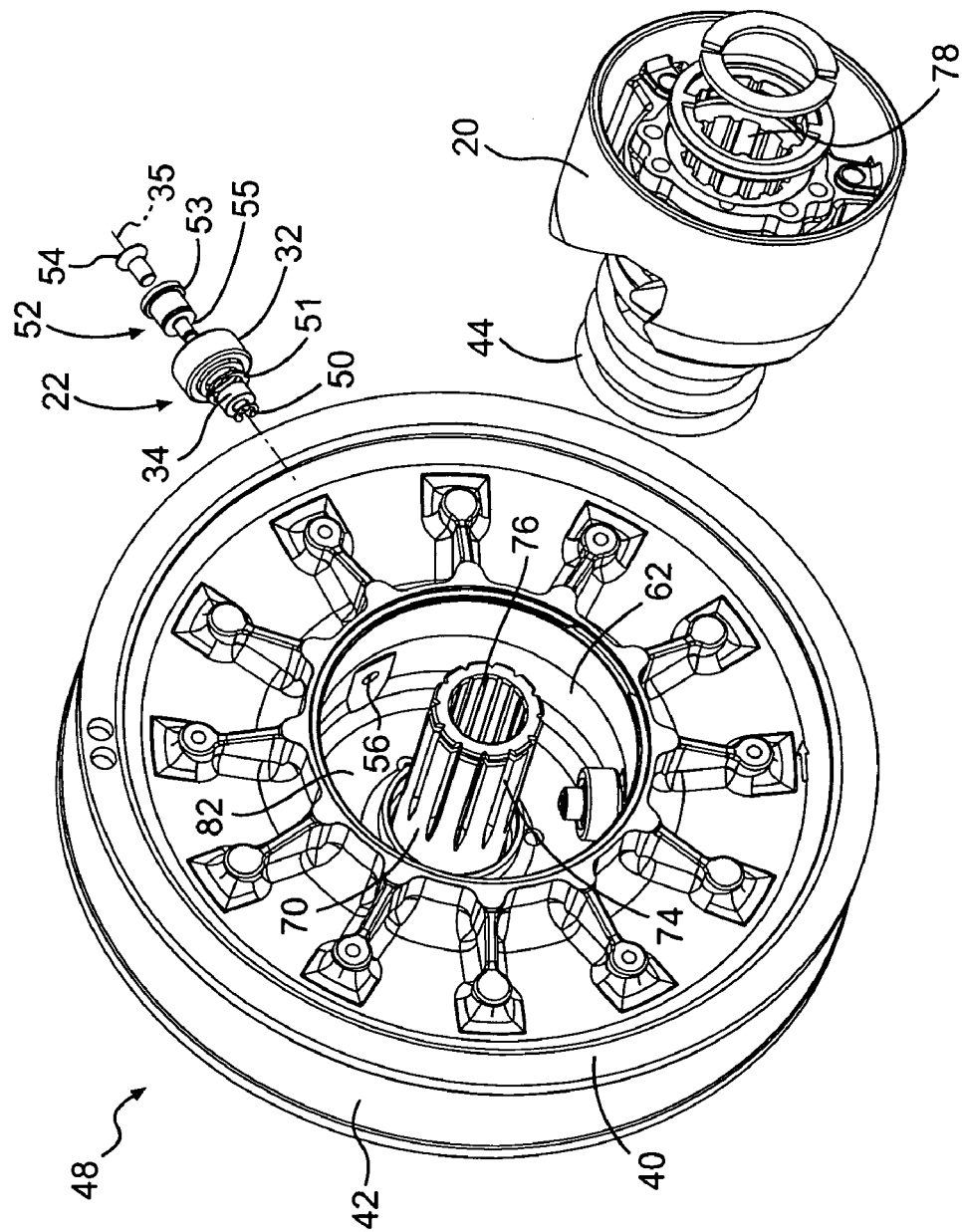
FIG. 3A is an exploded view of a driven pulley along with the roller and cam of the present invention.
Figure 3B:
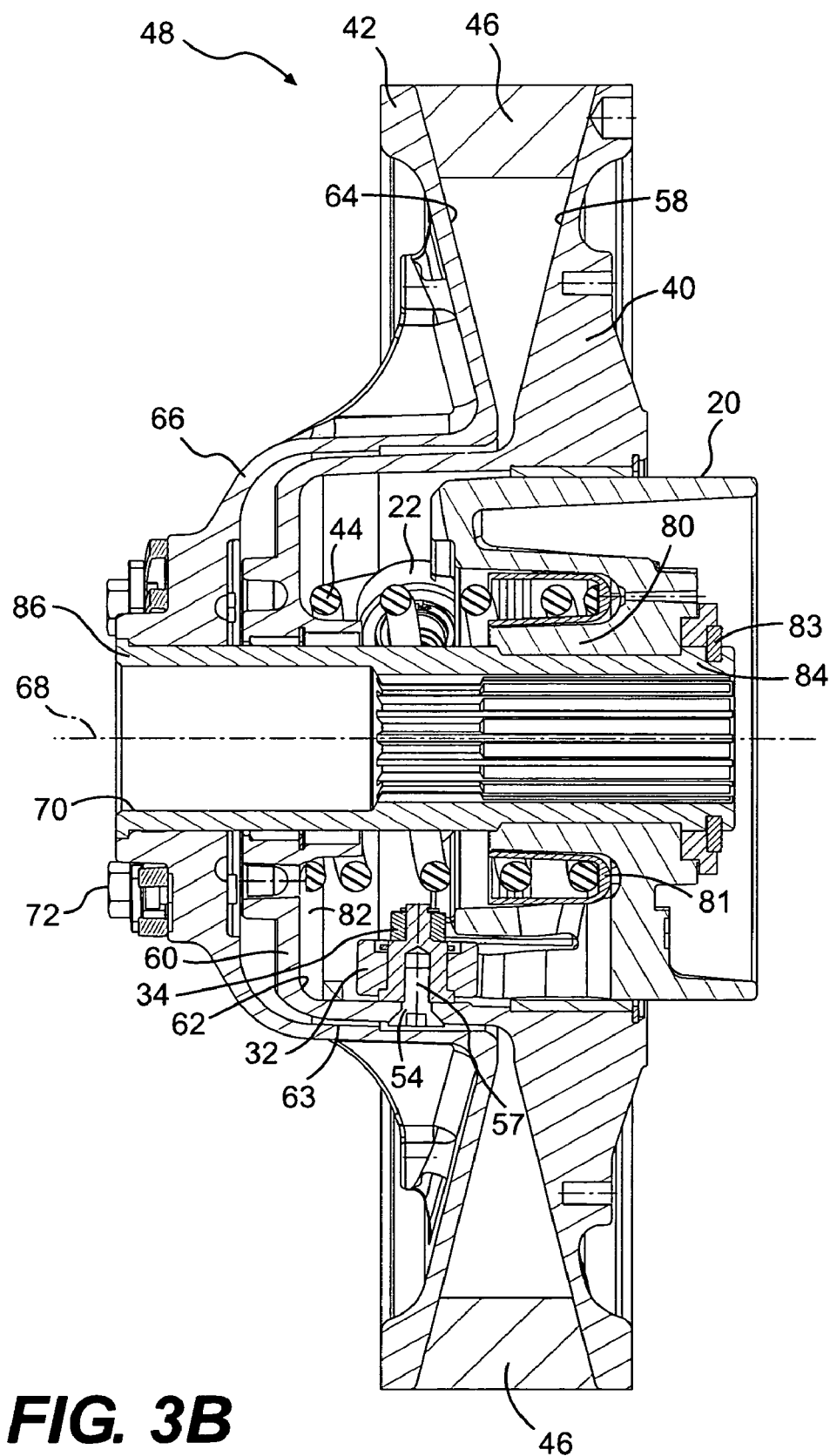
FIG. 3B is a cross section of the driven pulley including the roller and cam of the present invention.

Cam 20 also has a cylindrical wall portion 80 surrounding axis of rotation 36 which has a hole through the center thereof for receiving shaft 70, see FIG. 3B. Cam 20 also has a spring seat 81 between the cylindrical wall 80 and the cam surfaces 24, 26, 28, 30 and 38.

Figure 7:
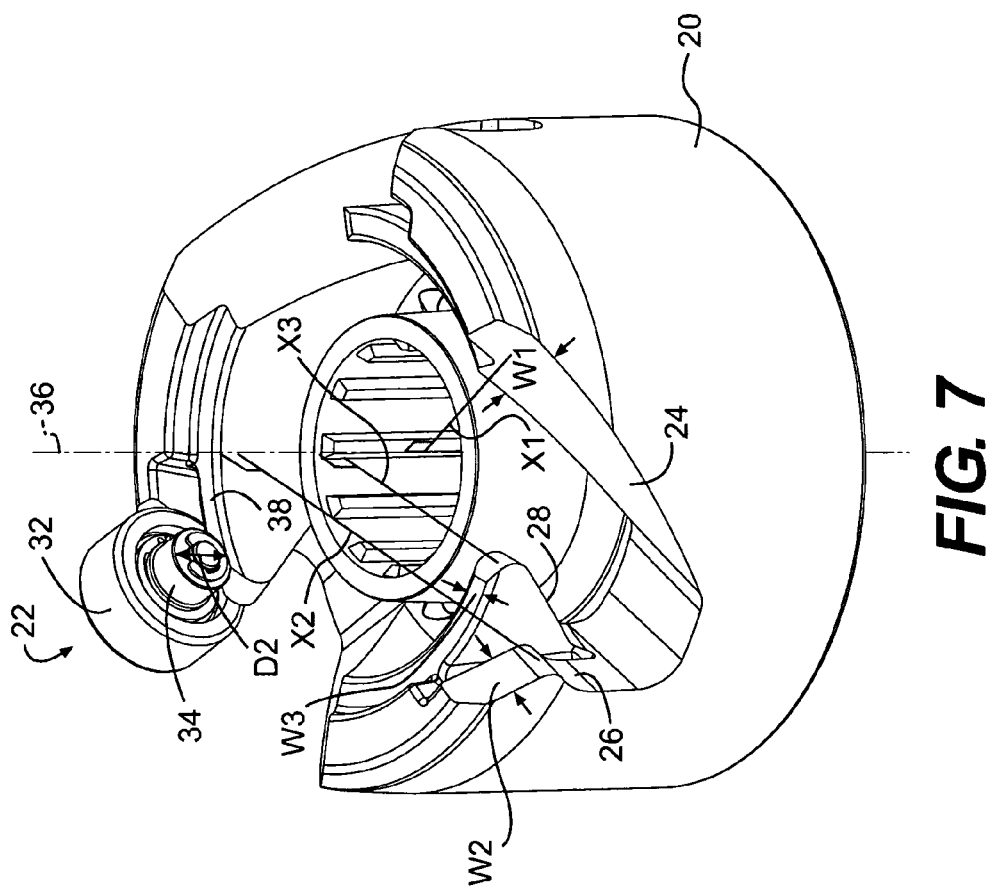
FIG. 7 is a top perspective view of the cam of the present invention showing the roller in the position when the driven pulley torque is in reverse direction. The roller is prevented from any axial movement along surfaces 26 or 30.

Roller assembly 22 has an outer roller 32 having a diameter D1 and an inner roller 34 having a diameter D2, best seen in FIG. 7. It is preferred that the roller with the largest diameter be furthest from the axis of rotation 36 of cam 20 in the radial direction. While the preferred embodiment has the inner roller 34 and the outer roller 32 as separate rollers rotating co-axially, it is contemplated that the rollers 32, 34 could be separated to rotate non co-axially. It is also contemplated that rollers 32, 34 be part of one roller having two rolling or contacting surfaces of different diameters. It is also contemplated that roller 34 simply be a pin which does not rotate about axis 35 (FIG. 3A) and thus slides over cam surfaces 28 and 38 as will be described in further detail below.

Shown in FIG. 3, roller assembly 22 is in a position where the inner and outer sheaves of the driven pulley are close to each other, known as a fully closed position which is shown in FIG. 3B. Due to torque changes in the driven pulley 48, roller assembly 22 rolls along cam surface 24 between positions shown in FIG. 3 and FIG. 5.

Referring now to FIGS. 3A and 3B. FIG. 3A shows an exploded view of a driven pulley 48 including the roller assembly 22 and cam 20 of the present invention. As can be best seen in FIG. 3B, outer roller 32 and inner roller 34 of the roller assembly 22 are fixed to rotate adjacent inner surface 62 of cup-shaped portion 60 of inner sheave 40 using a pivot 52 and a screw 54 (best seen from FIG. 3A). Pivot 52 is constructed in the shape of a cylinder having two different diameters. A first shoulder 53, and a second shoulder 55 created by the change in diameters, hold rollers 32 and 34 onto pivot 52. Roller 32 is cylindrical in shape having an outside diameter D1 and an inside diameter D3, see FIG. 3, of the size to accept the larger of the two diameters of pivot 52. Roller 34 is of the same construction as roller 32 with an outside diameter of D2 and an inner diameter D4, not shown, to accept the smaller of the two diameters of pivot 52. C-clips 50 and 51 are used to hold inner and outer rollers 32, 34 to the pivot 52 such that rollers 32 and 34 can rotate with respect to pivot 52 about axis 35 but cannot move axially with respect to pivot 52 along axis 35. Inner and outer rollers 32 and 34 and pivot 52 are held to the inner sheave 40 by screw 54 as shown in FIG. 3A. Pivot 52 includes a threaded portion 57 to accept screw 54, best seen in FIG. 3A.

Inner sheave 40 has a conical or progressively-shaped belt-engaging surface 58 along with a cup-shaped portion 60. Best seen in FIG. 3B, the roller and pivot assembly is attached to the inner surface 62 of cup portion 60 of the inner sheave 40. The cup portion 60 has a hole 56 (FIG. 3A) passing therethrough for the passage of the threaded portion of screw 54. Once screw 54 is passed through hole 56 (FIG. 3A) from the outer surface 63 to the inner surface 62 of cup shaped portion 60 and threaded into the pivot 52 placed adjacent to the inner surface 62, rollers 32 and 34 are fixed to the inner sheave 40 as shown in FIG. 3B.

Also shown in FIG. 3B, outer sheave 42 includes a belt-engaging conical shaped surface 64 and a cup shaped portion 66. Cup shaped portion 60 of the inner sheave 40 slides in and out of cup shaped portion 66 of the outer sheave 42 along axis 68 of the driven pulley 48. Inner sheave 40, outer sheave 42, and cam 20 are all held co-axial by shaft 70. Outer sheave 42 is fixedly held to shaft 70 and thus rotates with and does not move along axis 68 with respect to the shaft 70. Cam 20 is also held non-moveable with resect to shaft 70 via a first set of splines 74 on shaft 70 and a second set of splines 78 on cam 20 mating with splines 74. Cam 20 is prevented from slipping off shaft 70 by a key 83 on the inner end 84 of shaft 70. Inner sheave 40 is placed between the outer sheave 42 and the cam 20 so that axial movement along shaft 70 is permitted against the biasing spring 44 and pressure created from the drive belt 46.

Inner sheave 40 has a spring seat 82 facing spring seat 81 of cam 20. A plastic insert (not shown) could be used to prevent wear between the spring 44 and spring seat 81. Spring 44 is placed over shaft 70 between the inner sheave 40 and the cam 20 such that inner sheave 40 is moveable in the axial direction against the force of the spring 44. Movement of the inner sheave 40 in the axial and radial directions with respect to shaft 70 and thus with respect to outer sheave 42, is permitted due to the freedom of roller assembly 22 to travel within the area defined by cam surfaces 24, 26, 28 and 30. Without movement of roller assembly 22 along or between cam surfaces 24, 26, 28 and 30, there is no relative movement between inner and outer sheaves 40, 42. It is to be understood that, as shown in FIG. 3B, the inner and outer sheaves 40, 42 are biased toward each other in a fully closed position due to the force of spring 44 acting against cam 20 and inner sheave 40. When torque is transmitted from the belt to inner sheave 40, inner sheave 40 rotates with the belt 46 and thus roller assembly 22 contacts cam surface 24, 26 or 30 depending on the direction of the torque being transmitted. Due to the angle of the cam surfaces, the inner sheave 40 is forced toward the fully open position as the torque transferred from the belt 46 to the inner sheave 40 is increased and overcomes the biasing force of spring 44 and the cam reaction force. The cam reaction force is the component of the reaction force between the contact point of the cam roller with the cam surface acting along the axis of rotation of the inner sheave 40.

In a fully closed position, with the pulley under positive torque (torque being transmitted from the engine to the track/wheels) the roller 22 will be in the position shown in FIG. 3. As long as the torque transmitted to the driven pulley is positive, the roller assembly 22 will stay in contact with the cam surface 24 somewhere along the positions shown in FIG. 3 and FIG. 5. It would be understood that under extreme cases of engine braking, the roller assembly 22 could be in a position where it does not contact cam surface 24 while the driven pulley 48 is not rotating.

Figure 4:
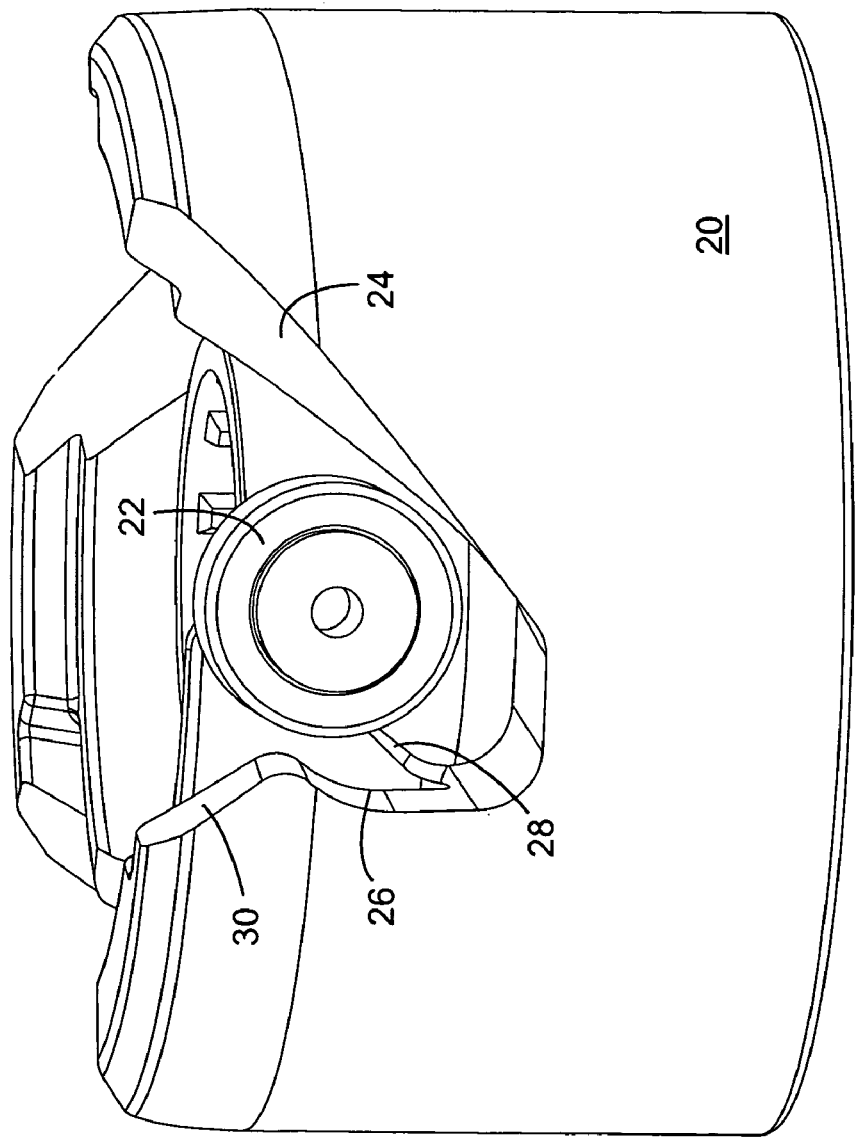
FIG. 4 is a side view of the cam of the present invention with the roller situated in a position where an inverse in torque is taking place at the driven pulley while the driven pulley is rotating in the forward direction.
Figure 5:
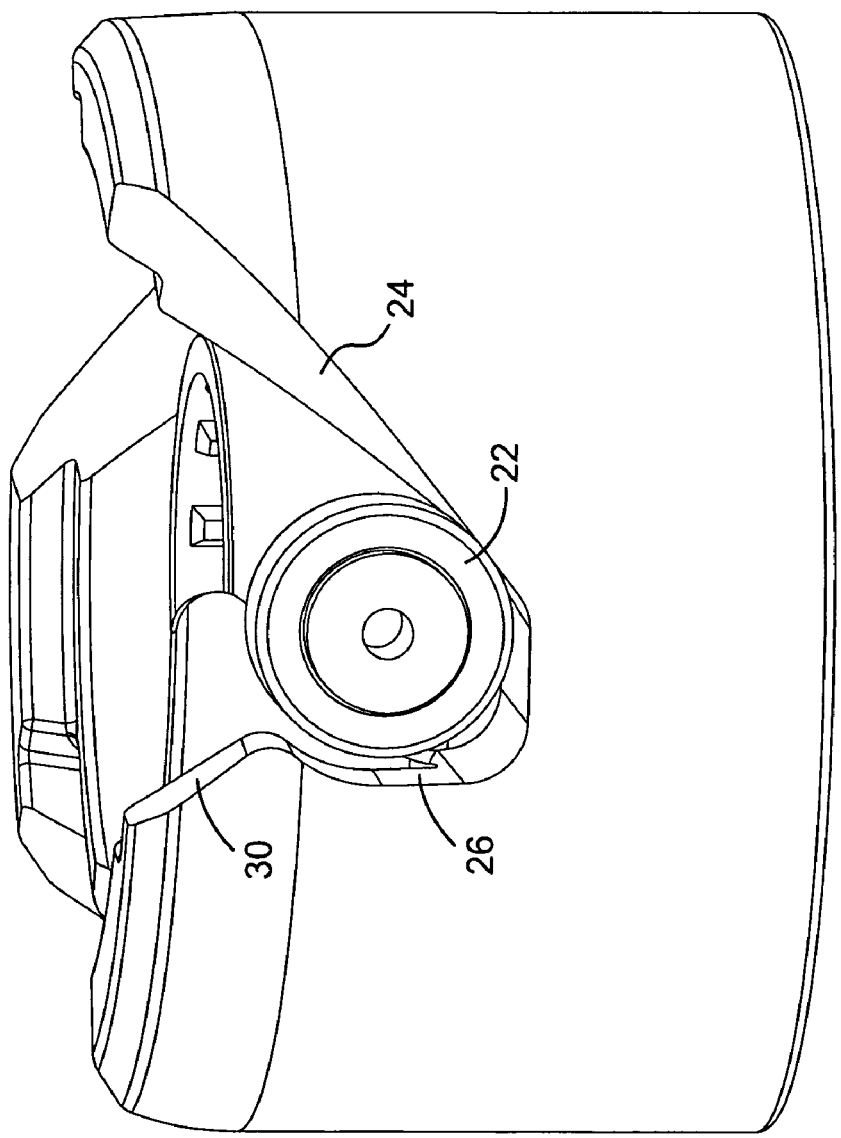
FIG. 5 is a side view of the cam of the present invention with the roller situated in a position where the driven pulley is in a fully opened position.
Figure 6:
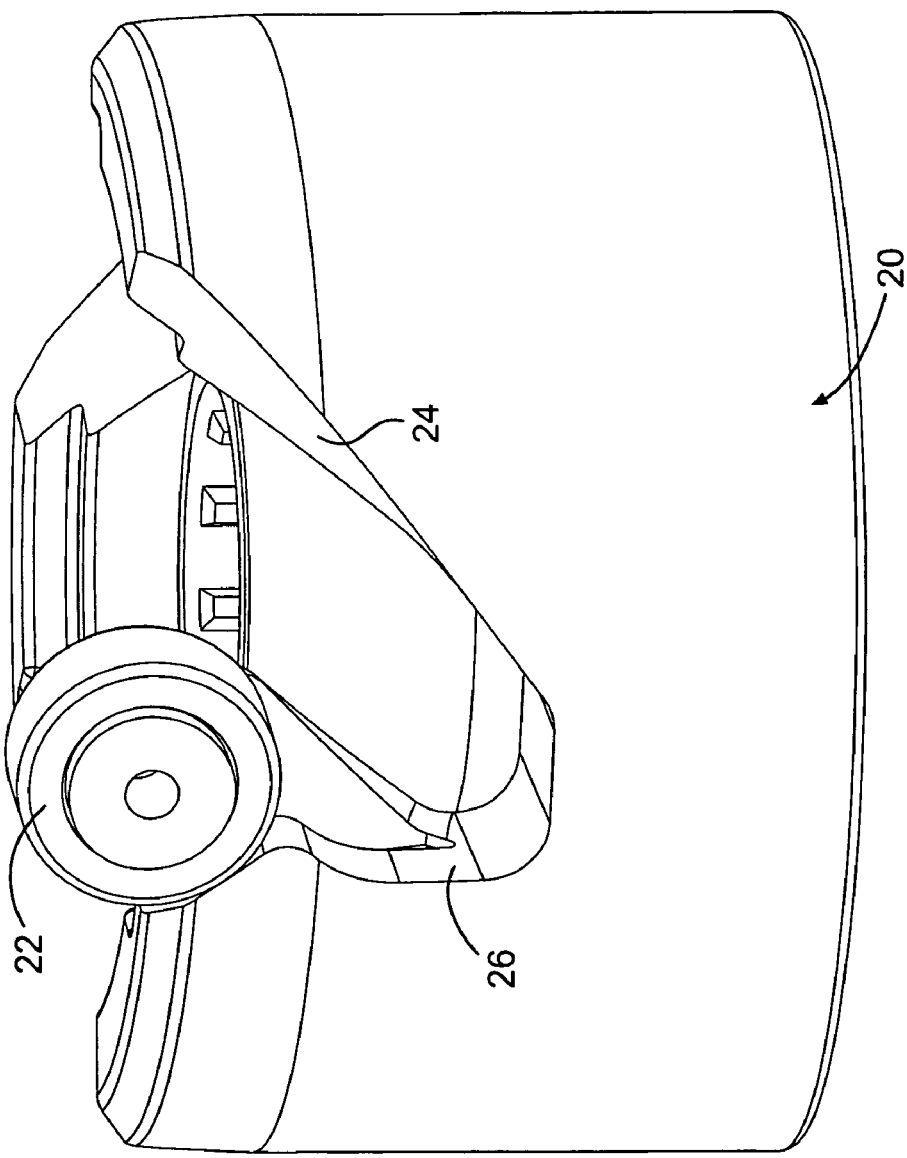
FIG. 6 is a side view of the cam of the present invention with the roller in the position where the torque applied to the driven pulley is in the reverse direction to the forward rotating direction of the pulley. The roller is prevented from any axial movement along surfaces 26 or 30.

During a change in direction of the torque transmitted to the driven pulley 48 i.e. from the track or wheels to the engine, the roller assembly 22 will be forced away from the cam surface 24 toward cam surface 26 or cam surface 30 such as is shown in FIGS. 4 and 6. As the roller assembly 22 is travelling from one cam surface to the other, there is an instance that the roller is not in contact with neither cam surface 24, 26, 30 or as will be described below, third cam surface 28.

During a second change in direction of the torque, i.e. back to the engine transmitting torque to the track or wheels, the roller assembly 22 will be forced back toward cam surface 24. During this travel, while the roller assembly 22 is neither supported by cam surfaces 24, 26 or 28, the biasing force of the spring 44 alone could be insufficient to overcome the force of the drive belt 46 thus the inner sheave 40 will be suddenly pushed away from the outer sheave 42 until roller assembly 22 finally contacts cam surface 24 once again somewhere along the cam surface 24, but in a much higher gear ratio, i.e. closer to the fully opened position shown in FIG. 5. Now that the driven pulley has been suddenly shifted to a higher gear ratio, the driven pulley 48 must backshift to a lower gear ratio, i.e. the roller assembly 22 must travel toward the fully closed position shown in FIG. 3, in order for the RPM of the drive pulley 164, (shown in FIGS. 9 an 10) to remain at the calibrated RPM. Before the transmission gets back into a lower gear, which will help the vehicle to accelerate, the vehicle will have the feeling of being sluggish and non-responsive. An analogy can be made to engaging the clutch of a slow moving automobile with a manual transmission while the transmission is in third or fourth gear, if the engine does not stall, it will move very slowly because a higher torque output from the engine is required.

It will be appreciated that the greater the distance between cam surfaces 24 and cam surfaces 26 or 30, the greater the time it will take the roller assembly 22 to travel from one surface to the other. As described above, this allows the inner sheave 40 more time to move away from the outer sheave 42 thus allows the belt to drop to a smaller diameter or higher gear ratio. By decreasing the distance between these cam surfaces, the roller assembly 22 can shift from one cam surface to the other in a shorter time interval and thus the inner sheave 40 will not move as far from the outer sheave 42 until roller assembly 22 is again supported by cam surface 24 and thus will remain substantially in the same gear ratio as before the shift in torque occurred.

It is known by persons skilled in the art that reverse cam surface 30, which is angled in the opposite direction as cam surface 24, is needed when the driven pulley is to be used for operating a vehicle in reverse. Reverse cam surface 30 is normally angled between 45 degrees to 90 degrees with cam surface 24. Without the cam surface 30, which is angled in the opposite direction to cam surface 24, the driven pulley would automatically go to a fully opened position, high gear ratio, upon activation of the reverse mode and thus would cause the belt to undergo exponential slipping. Since the reverse mode is normally activated once the vehicle has stopped moving in the forward direction, a low gear ratio is desired to get moving again in the reverse direction.

As can be seen from FIG. 3, cam 20 of the present invention has a third helix having cam surface 28. Cam surface 28 is preferably radially offset from the cam surfaces 24 and 30 toward the axis of rotation 36 of cam 20, but could also be situated on the opposite side of cam surfaces 24 and 30 from the axis of rotation 36. Cam surface 28 is angled approximately in the same direction as that of cam surface 24. Cam surface 28 is also situated between reverse cam surface 30 and cam surface 24 in the circumferential direction. Cam surface 28 also has a top surface 38, which will contact the inner roller 32 of roller assembly 22, which will be explained in further detail below.

Referring now to FIG. 7, roller assembly 22 is positioned with cam 20 as if the CVT is operating in reverse mode. In this reverse position, the inner roller 34 is in contact with cam surface 38 and outer roller 32 is in contact with cam surface 30. With cam 20 in this position, roller assembly 22 is locked from any axial movement relative to cam 20. In other words, in this position, inner sheave 40 is prevented from moving away from outer sheave 42. This ensures that the driven pulley 48 will remain in a low gear ratio once the CVT begins to rotate in the reverse direction. Since the reverse direction is normally used at very low speeds, having the transmission locked at one gear ratio is not a drawback; in fact, most vehicles' engine speed is electronically limited to a low speed when in the reverse mode, i.e. 10 km/h. Depending on the gear ratio desired when the transmission is in reverse mode, the axial positioning of the cam surface 38 could be placed at different locations. In the embodiment shown in FIG. 3, roller 34 contacts the locking cam surface 38 at the lowest gear ratio possible to ensure easy reversal of the vehicle. Due to machining tolerances, the locking cam surface 38 is preferably located so that the roller 34 makes contact with the locking cam surface 38 when the inner sheave 40 is between 75% and 100% of its fully closed position.

Figure 8:
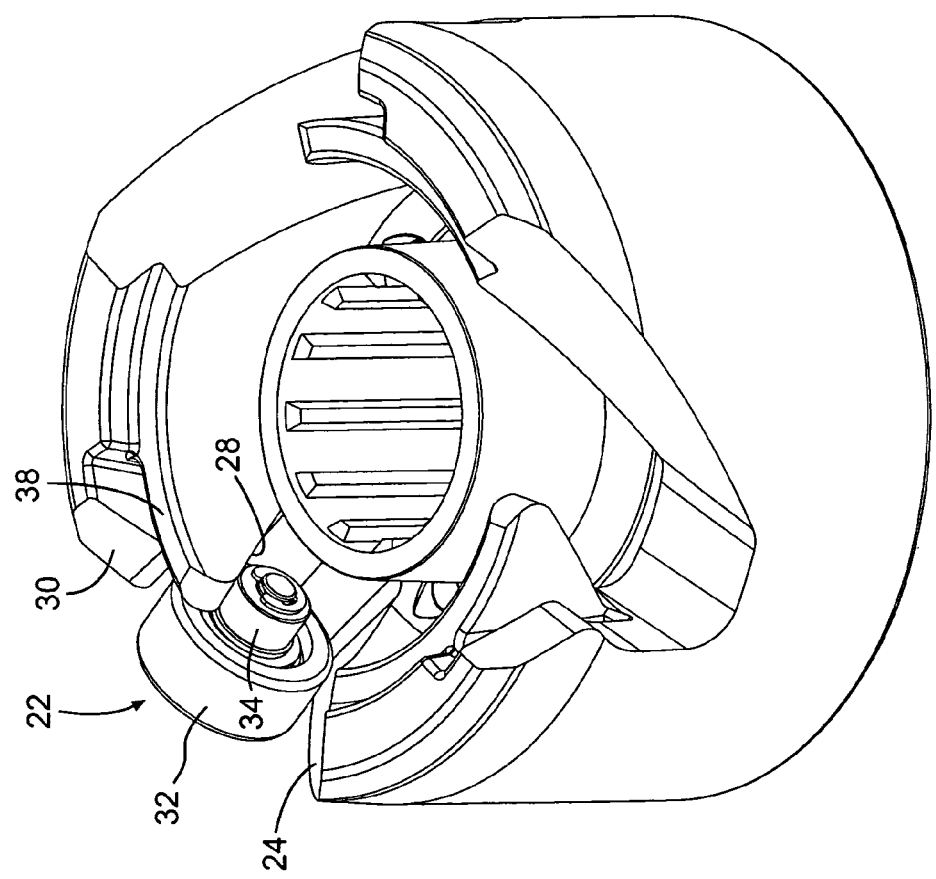
FIG. 8 is a top perspective view of the cam of the present invention showing the roller in a position where an inverse in torque is taking place at the driven pulley while the driven pulley is rotating in the forward direction.

Referring now to FIG. 8, third cam surface 28 will be explained in further detail. When roller assembly 22 is in contact with cam surface 24 with the transmission rotating in the forward direction, and the transmission experiences a reverse in the direction of torque transmitted to the driven pulley, as explained above, the roller assembly 22 will be forced toward cam surfaces 26 or 30, depending where the roller was situated along cam surface 24. In the prior art cam, the roller assembly 22 would have traveled all the way to cam surfaces 26 or 30 allowing the roller to be pushed toward a high gear ratio as explained above in paragraphs 31-33. Cam surface 28 of cam 20 of the present invention, prevents the roller from travelling the complete distance to cam surfaces 26, 30. It will be appreciated that if roller assembly 22 is prevented from travelling the greater distance, the shorter time interval that the roller assembly 22 is not supported by any cam surface upon the change in torque, will prevent the inner sheave 40 from being pushed far away from the outer pulley 42, shifting the transmission into a higher gear ratio. Thus, the engines' RPM will remain as desired and the pilot of the vehicle will not notice any difference in vehicle performance. The combination of two rollers, each having a different diameters and the additional helix, allows the big roller to withstand the majority of the loads at high torque input and also allows for a small displacement of the rollers during a change of direction of torque.

It would be understood by one skilled in the art that although cam surfaces 28 and 38 are shown as being disposed on the same wall, and have been described as being used together on a single cam, the benefits of having the locking feature of cam surface 38 and the benefits of having the shorter travel distance offered by cam surface 28 could be achieved separately and used one without the other.

Figure 9:
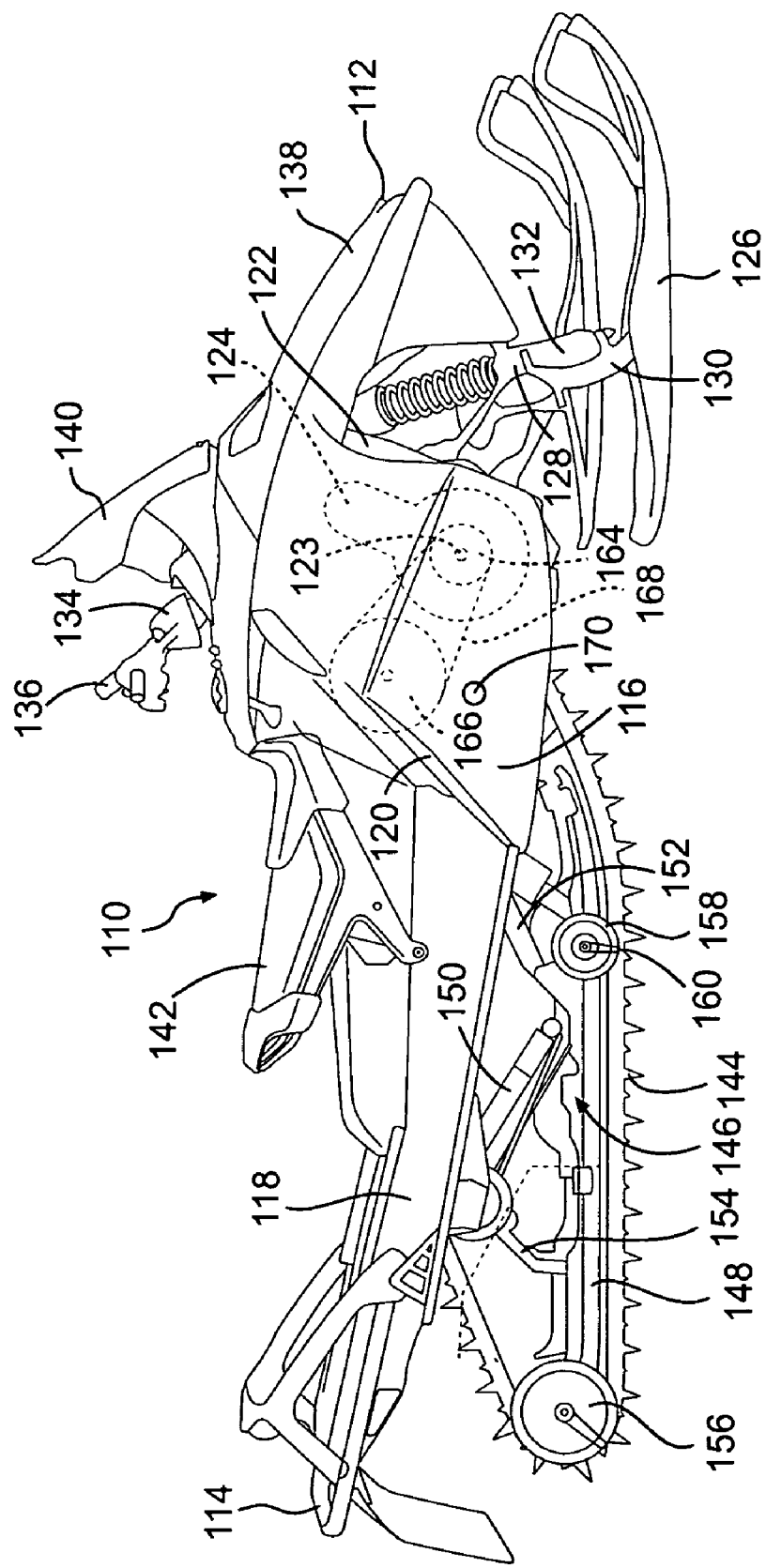
FIG. 9 is a side view of a snowmobile including the driven-pulley cam and roller of the present invention.

Such a pulley cam and roller of the present invention is suitable for use on snowmobile's, ATV's, automobiles and any other vehicle driven by a continuously variable transmission. For example, FIG. 9 shows a snowmobile incorporating the present invention and is identified generally by the reference numeral 110. The snowmobile 110 includes a forward end 112 and a rearward end 114, which are defined consistently with the travel direction of the vehicle. The snowmobile 110 further includes a chassis 116 which normally includes a rear tunnel 118, an engine cradle portion 120 and a front suspension assembly portion 122. An engine 124 which is schematically illustrated by broken lines is mounted to the engine cradle portion 120 of the chassis 116. A ski and steering assembly (not indicated) is provided, in which two skis 126 are positioned at the front end 112 of the snowmobile 110, and are attached to the front suspension assembly portion 122 of the chassis 116 through a front suspension assembly 128. The front suspension assembly 128 includes ski legs 130, supporting arms 132 and ball joints (not shown) for operatively joining the respective ski legs 130, supporting arms 132 and a steering column 134. The steering column 134 at its upper end is attached to a steering device such as handlebars 136 which is positioned forward of a driver (not shown) and behind the engine 124 to rotate the ski legs 130 and thus the skis 126, in order to steer the vehicle.

At the front end 112 of the snowmobile 110 there are provided fairings 138 that not only protect the engine 124, but can also be decorated to make the snowmobile 110 more aesthetically pleasing. A windshield 140 may be connected to the fairings 138 near the front end 112 of the snowmobile 110 or may be attached directly to the handlebars 136. The windshield 140 acts as a wind screen to lessen the force of air on the driver while the snowmobile 110 is traveling. A seat 142 is provided on the rear tunnel 118 to position the driver and any rider of the vehicle.

An endless drive track 144 is positioned at the rear end 114 of the snowmobile 110, and is disposed under rear tunnel 118, being operatively connected to the engine 124 via CVT 162. CVT 162 includes a drive pulley 164 rotating with an output shaft 123 of the engine 124, a driven pulley 166 including the cam 20 and roller 22 of the present invention and an endless drive belt 168 connecting the drive pulley 164 with the driven pulley 166 as described above in paragraph 27. One skilled in the art would recognize that driven pulley 166 could be directly connected to a front drive axle 170 or it could be connected to the front drive axle 170 via a gear reduction unit (not shown) in order to rotate the endless drive track 144.

Thus, the endless drive track 144 is driven to run about a rear suspension assembly 146 for propulsion of the snowmobile 110. The rear suspension assembly 146 includes a pair of slide rails 148 in sliding contact with the endless drive track 144. The rear suspension assembly 146 also includes one or more shock absorbers 150 which may further include a coil spring (not shown) surrounding the individual shock absorbers 150. Front and rear suspension arms 152, 154 are provided to attach the slide rails 148 to the chassis 116. One or more idler wheels which include a pair of rear idler wheels 156 and a pair of other idler wheels 158, are also provided in the rear suspension assembly 146.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A Continuously Variable Transmission driven-pulley comprising:
    an outer sheave;
    an inner sheave adjacent the outer sheave, the inner sheave having a fully opened position and a fully closed position with respect to the outer sheave;
    a spring biasing the inner sheave toward the outer sheave, the spring resisting movement of the inner sheave toward the fully opened position in response to torque being applied to the inner sheave;
    at least one roller assembly, the at least one roller assembly being connected to one of the outer sheave and the inner sheave;
    a cam, the cam being connected to the other of the inner sheave and the outer sheave, the cam comprising:
        an axis of rotation;
        a first helix having a first contact surface, the first contact surface being radially offset from the axis of rotation by a first distance;
        a second helix having a second contact surface facing toward the first contact surface, at least a portion of the second contact surface being radially offset from the axis of rotation by the first distance, the second contact surface adapted to contact the at least one roller assembly; and
        a third helix having a third contact surface, the third contact surface being radially offset from the axis of rotation by a second distance, the third contact surface being circumferentially placed between the first contact surface and the second contact surface and facing the first contact surface, the third contact surface adapted to contact the at least one roller assembly,
        a position of the first, second, and third helixes relative to each other being fixed,
    the inner sheave being movable relative to the outer sheave between:
        a first position, wherein the at least one roller assembly is in contact with the first contact surface;
        a second position, wherein the at least one roller assembly is in contact with the second contact surface; and
        a third position, wherein the at least one roller assembly is in contact with the third contact surface.

2. The Continuously Variable Transmission driven-pulley of claim 1, wherein the first contact surface has a first normal, and when the first normal is projected onto a plane containing the axis of rotation, the first normal is pointing toward the fourth quadrant of a Cartesian coordinate system having an x-axis lying on the axis of rotation, the second contact surface has a second normal, and when the second normal is projected onto the axis of rotation, the second normal is pointing toward the first quadrant, and the third contact surface has a third normal, and when the third normal is projected onto the axis of rotation, the third normal is pointing toward the second quadrant.

3. The Continuously Variable Transmission driven-pulley of claim 2, wherein the second contact surface further comprises a fourth contact surface radially offset from the axis of rotation by the first distance, the fourth contact surface having a fourth normal, and when the fourth normal is projected onto the axis of rotation, the fourth normal is pointing toward the first quadrant.

4. The Continuously Variable Transmission driven-pulley of claim 3, wherein the fourth contact surface is continuous with the second contact surface in the axial direction.

5. The Continuously Variable Transmission driven-pulley of claim 3, wherein the third helix further comprises a fifth contact surface, the fifth contact surface preventing axial movement of the roller assembly with respect to the cam when the inner sheave is between 75% and 100% of the fully closed position.

6. A Continuously Variable Transmission driven-pulley comprising:
    an outer sheave;
    an inner sheave adjacent the outer sheave
    a spring biasing the outer sheave and the inner sheave toward each other, the spring resisting movement of the inner sheave away from the outer sheave in response to torque being applied to the inner sheave;
    a cam having at least two opposed helices, the cam permitting movement between the inner sheave and the outer sheave, a position of the two opposed helices relative to each other being fixed; and
    at least one roller assembly in rolling contact with the cam, the at least one roller assembly comprising:
        an axis of rotation;
        a first rolling surface having a first outer diameter adapted to contact one of the at least two helices, the first rolling surface rotating about the axis of rotation; and
        a second surface having a second outer diameter adapted to contact the other of the at least two helices, the second diameter being different from the first diameter, the second surface being co-axial with the first rolling surface.

7. The Continuously Variable Transmission driven-pulley of claim 6, wherein the at least one roller assembly further comprises a first roller and a second roller, the first roller including the first rolling surface and the second roller including the second rolling surface.

8. The Continuously Variable Transmission driven-pulley of claim 6, wherein the first rolling surface is fixed to the second rolling surface and the two rolling surfaces rotate simultaneously about the axis of rotation.

9. The Continuously Variable Transmission driven-pulley of claim 6, wherein the first rolling surface is separate from the second rolling surface and the two rolling surfaces can rotate individually about the axis of rotation.

10. A Continuously Variable Transmission driven-pulley comprising:
    an outer sheave;
    an inner sheave adjacent the outer sheave, the inner sheave having a fully opened position and a fully closed position with respect to the outer sheave, a spring biasing the inner sheave being biased toward the outer sheave, the spring resisting movement of the inner sheave toward the fully opened position in response to torque being applied to the inner sheave;

at least one roller assembly, the at least one roller assembly being connected to one of the outer sheave and the inner sheave;

a cam, the cam being connected to the other of the inner sheave and the outer sheave, the cam comprising:

an axis of rotation;

a first roller contact surface situated at a first distance from the axis of rotation, the first roller contact surface contacting the at least one roller assembly to transmit torque in a first direction;

a second roller contact surface having a least a portion situated at the first distance from the axis of rotation, the second roller contact surface contacting the at least one roller assembly to transmit torque in a second direction opposite to the first direction;

and a third contact surface situated at a second distance from the axis of rotation, the second distance being shorter than the first distance, the third contact surface contacting the at least one roller assembly to transmit torque in the second direction, the third contact surface being circumferentially placed between the first roller contact surface and the second roller contact surface, a position of the first roller contact surface, the second roller contact surface, and third contact surface relative to each other being fixed, the inner sheave being movable relative to the outer sheave between:

a first position, wherein the at least one roller assembly is in contact with the first roller contact surface;

a second position, wherein the at least one roller assembly is in contact with the second roller contact surface;

and a third position, wherein the at least one roller assembly is in contact with the third contact surface.

11. The Continuously Variable Transmission driven-pulley of claim 10, wherein the first roller contact surface has a first width, the second roller contact surface has a second width, and the third contact surface has a third width.

12. The Continuously Variable Transmission driven-pulley of claim 10, wherein the at least one roller assembly further comprises a first rolling surface and a second rolling surface, the first rolling surface having a first diameter and the second rolling surface having a second diameter smaller than the first diameter, the first rolling surface contacting the first and second roller contact surfaces and the second rolling surface contacting the third contact surface.

13. The Continuously Variable Transmission driven-pulley of claim 10, wherein the at least one roller assembly further comprises a first surface and a second surface, the first surface being a rolling surface contacting the first and second roller contact surfaces, and the second surface being a sliding surface contacting the third contact surface.

* * * * *